United States Patent [19]

Knesewitsch et al.

[11] Patent Number: 4,614,877

[45] Date of Patent: Sep. 30, 1986

[54] APPARATUS FOR A REDUNDANT POWER SUPPLY

[75] Inventors: Jakob Knesewitsch; Manfred Pointner, both of Munich, Fed. Rep. of Germany

[73] Assignee: Siemens Aktiengesellschaft, Berlin & Munich, Fed. Rep. of Germany

[21] Appl. No.: 712,444

[22] Filed: Mar. 18, 1985

[30] Foreign Application Priority Data

Mar. 20, 1984 [DE] Fed. Rep. of Germany ....... 3410194
Jan. 18, 1985 [EP] European Pat. Off. ........ 85100505.8

[51] Int. Cl.$^4$ .......................... H02J 7/00; H01R 4/66
[52] U.S. Cl. ........................ 307/64; 307/65; 307/66; 339/14 P; 361/2; 361/3
[58] Field of Search .............. 307/65, 85, 86, 64, 307/66, 71, 82, 87, 150, 151; 339/14 P; 361/2, 3

[56] References Cited

U.S. PATENT DOCUMENTS

| 2,918,588 | 12/1959 | Rittenhouse et al. | 361/3 |
| 3,993,935 | 11/1976 | Phillips et al. | 361/397 X |
| 4,177,389 | 12/1979 | Schott | 307/86 |
| 4,346,419 | 8/1982 | Janniello | 361/2 |
| 4,544,978 | 10/1985 | Podobinski | 361/3 |
| 4,584,621 | 4/1986 | Yang | 361/3 |

OTHER PUBLICATIONS

Greer et al, IBM Technical Disclosure Bulletin (Non-arcing connector), 9/84, p. 2722.

Primary Examiner—William M. Shoop, Jr.
Assistant Examiner—Alfred Hoyte
Attorney, Agent, or Firm—Hill, Van Santen, Steadman & Simpson

[57] ABSTRACT

Apparatus for a redundant power supply comprises a receptacle and a pair of power supply inserts received therein and having connectors for the input voltage and for the output voltage. The outputs of two or more such power supply inserts are directly connected in parallel to one another. To this end, differently designed or arranged contact members for the input voltage and for the output voltage are provided. In a preferred embodiment, so-called leading contacts are employed for a charging current at the output side via a charging resistor before connecting the output of the insert being plugged in parallel with the output of an operating insert.

9 Claims, 9 Drawing Figures

APPARATUS FOR A REDUNDANT POWER SUPPLY

BACKGROUND OF THE INVENTION

1. Field of the Invention

The present invention relates to power supplies and is particularly concerned with redundant power supplies which are provided with connectors for the input and output voltages.

2. Description of the Prior Art

Unless special measures are taken, a collapse of the output voltage of a power supply and, therefore, a temporary or permanent disruption of the system operation occurs in electronic systems supplied by redundantly-operated power supplies when the second power supply is plugged in, for example after a repair. This disruption is caused in that the output capacitor, already charged to the operating voltage, of the power supply already in operation has the uncharged output capacitor of the power supply being plugged in connected in parallel thereto when the second power supply is plugged in and this leads to a collapse of the operating voltages.

The invention relates to an apparatus for a redundant power supply comprising a receptacle apparatus and at least two power supply inserts which are insertable into the receptacle apparatus and which are mechanically supported in the receptacle apparatus in their inserted condition, whereby the receptacle apparatus and the power supply inserts are provided with plug connectors which comprise contact members for the input voltage and contact members for the output voltage of the respective power supply insert, whereby the power supply insert contains an output capacitor which is respectively, directly connected to the plug connector of the power supply insert.

U.S. Pat. No. 4,177,389, fully incorporated herein by this reference, discloses such an apparatus. In this known apparatus for a redundant power supply, two regulated power supply devices which are electrically connected in parallel at the output side are provided. Both devices are constructed in identical fashion. The power elements of the power supply inserts are connected directly parallel only with their grounded negative poles. The positive poles are interconnected via two strapping plugs. The power element and the appertaining strapping plug are structurally designed such that a removal and insertion of the power element is not possible until after the appertaining strapping plug has been removed. It is assured by these measures that, when the power element is plugged in, an output capacitor is first charged via two resistors without influencing the load feed. The strapping plug can then be inserted and the power element can be subsequently placed in operation.

Another solution of the problem initially mentioned consists of incorporating a respective diode in the line between the output capacitor of each power supply and the parallel circuit point, these diodes only permitting an energy flow in the direction from the power supply device toward the load. The initially-described voltage collapse is thereby avoided without special structural measures being required therefor.

The voltage drop arising at these diodes, however, reduces the efficiency of the devices and increases the load-dependent output voltage fluctuations. The use of such decoupling diodes can therefore prove not permissible, particularly given low operating voltages and given a requirement of narrow tolerances.

U.S. Pat. No. 3,993,935, fully incorporated herein by this reference, discloses an assembly of data technology which has a plug connector with leading contacts. Achieved with the assistance of this plug connector is that, when the assembly is placed in operation, i.e. when the pin strip is plugged into an appertaining spring clip of a receptacle, the operation of the data processing device is not disrupted in that undefined operational conditions prevail at first and faulty signals are output onto a bus system. It is thereby specifically seen to that, when the plug connection is produced, the transmitter and the receiver are first supplied with operating voltage and control logic and a buffer memory are supplied with operating voltage and a reset potential. Further achieved with the assistance of current wipers that are respectively extended across a plurality of contact pairs is that certain connections are only produced after a completely inserted pin strip has been inserted free of cants. This applies, for example, to the connection of a reset input to a reset signal bus and to the supply of the operating voltage to circuits given an open collector output.

In the circuits having an open collector output, a finite capacitance is effective at the output, so that a load current flows from the bus line into these capacitances immediately after the plug connection has been produced. In order to thereby avoid voltage collapses on the bus line, an additional capacitor is disposed on the side of the bus line. An apparatus for limiting the plugging speed is not provided.

SUMMARY OF THE INVENTION

The object of the present invention is to provide an apparatus for a redundant power supply comprising a receptacle apparatus and at least two power supply inserts which are insertable into the receptacle apparatus, the power supply inserts being mechanically supported in the receptacle apparatus in their inserted condition, whereby the receptacle apparatus and the power supply inserts are provided with plug connectors which comprise contact members for the input voltage and contact members for the output voltage of the respective power supply insert and the power supply inserts respectively contain an output capacitor directly electrically connected to the plug connector of the power supply insert, such that the outputs of two or more power supply inserts, fully inserted into the receptacle apparatus, are immediately connected in parallel without strapping plugs being required for this purpose.

According to the invention, the apparatus for achieving the above object is designed such that the contact members are differently designed and arranged such that the end faces of the contact members for the input voltage are arranged offset in the plug-in direction relative to the end faces of the contact members for the output voltage and that the power supply inserts are provided with an insertion fixture which transfers the power supply insert from one position in which at least the contact members for the output voltage do not contact yet into the final position in which all pairs of contact members assigned to one another are in contact with one another.

By utilizing the above measures it is provided that, when a power supply insert is inserted into the receptacle apparatus, a connection of the contact members for the input voltage is produced first and the connection of the contact members for the output voltage is not produced until a later time. The advantage thereby derives that a power supply device that is additionally inserted already outputs the operating voltage when the connection at the output side is produced and no disruption of the system operation or, respectively, no inadmissibly great discontinuities of the output voltage can therefore occur. Deriving as a further advantage is that the capacitors are protected against short-circuit currents without special measures being required for this purpose.

The power supply device can be respectively provided with a separate plug connector for the input voltage and for the output voltage and the plug connectors can be designed, disposed or, respectively, selected such that, when the power supply insert is inserted at the receptacle apparatus the plug connector provided for the input voltage produces an electrical connection first and the plug connector provided for the output voltage produces an electrical connection at a later time. Identical plug connectors which, however, are disposed offset relative to one another in the plug-in direction can thereby be utilized.

According to a further feature of the invention, the apparatus is fashioned such that the contact members for the input voltage and the contact members for the output voltage are respectively located in one and the same multiple plug connector, and that only one of the multiple plug connectors assigned to one another respectively contains the differently disposed or designed contact members.

Advantageously, only the plug connector disposed in the power supply insert thereby contains the differently disposed or designed contact members.

In particular, a commercially-available blade plug connector having so-called leading contacts can be used as such a plug connector, whereby only the input voltage is conducted via leading contacts. In this case, the output voltage is conducted via the "non-leading" contacts of this blade connector.

The publication "Elektromechanische Bauteile für elektronische Geräte", Data Book 1980/81, Siemens AG, Order No. N 281-2009, Page 139, discloses multiple plug connectors for printed circuits which are designed as blade connectors and comprise one or, respectively, three leading contact blades at specific locations. Adhering to a prescribed sequence of contacting when producing a multiple plug connection can be assured with the assistance of such leading contact blades in electronic devices. Application instructions are thereby not provided. As proceeds, for example, from the German allowed published application No. 11 72 325, it can be a matter of a specific sequence in applying supply voltages to an electronic circuit, for example in the power supply of klystrons.

Advantageously, the multiple plug connector contains pin contact members engaging in sockets of the assigned multiple plug connector, whereby the pin contact members are arranged offset relative to one another.

According to another feature of the invention, the insert apparatus is simultaneously designed as an arresting device.

Advantageously, an apparatus for limiting the plugging speed in the time span between the contacting of the contact members for the input voltage and the contacting of the contact members for the output voltage is provided.

The apparatus for limiting the plugging speed provides that the output voltage of the power supply device that is additionally inserted into the receptacle is already present or, respectively, in its steady state at the time at which the outputs of the two power supply inserts are connected in parallel to one another.

The apparatus for limiting the plugging speed is preferably designed such that the insert apparatus is provided with at least one screw which is respectively held captive in the power supply insert and, when turned into assigned threads at the side of the receptacle, produces a translation of the power supply insert into a final position wherein all pairs of contact members assigned to one another are in engagement with one another.

The mechanical resistance of the contact members initially contacting one another can thereby suffice to form a detent, so that the plugging forces must be overcome with the assistance of the screws proceeding from the position of the power supply insert prescribed by the detent.

A particularly far-reaching protection against too fast a chronological succession of the contacting can be achieved in that the screws form a detent in one position of the power supply insert wherein the mutually assigned contact members for the output voltage are at a predetermined distance from one another.

In particular, the fastening screws provided in the inserts can thereby be utilized as a means for limiting the plugging speed. These fastening screws have heretofore served only for overcoming the plugging or, respectively, pulling forces when inserting or, respectively, pulling the inserts and are known, for example, from the German Gebrauchsmuster No. 79 08 078.

According to another feature of the invention, the apparatus is designed such that a contact member provided in the plug connector of the power supply insert, in addition to the contact members for the input voltage and the contact members for the output voltage, is connected via a resistor to a first terminal of the output capacitor, and that, in the receptacle, a contact member assigned to this additional contact member and the contact member assigned to the first terminal of the output capacitor are directly connected to one another. Furthermore, the contact members are differently disposed and/or designed such that, when the insert is inserted into the receptacle, the contact members for the resistor and the contact members for the second terminal of the capacitor come into contact with one another at an earlier time than the contact members assigned to the first terminal of the capacitor. The capacitor at the output of the power supply device to be placed in operation is charged not only proceeding from this power supply device itself, but is then also charged proceeding from the output of the other power supply device via a charging circuit at the output side.

The advantage therefore derives from the above measures that the storage capacitor at the output side is charged faster and, therefore, the plugging speed need be limited to only a reduced degree. In particular, the power supply device can be provided with a limitation of the cut-in or, respectively, start-up current without difficulties for the output-side parallel connection to one or more further power supply devices.

The contact members of the plug connectors can be designed and/or arranged such that, when the power supply device is inserted into the receptacle, the contact members for the input voltage are connected to one another in a first stage of the insertion and the contact members for the charging current at the output side are connected to one another in a second stage of the insertion, and that the direct parallel connection of the storage capacitors at the output side is not undertaken until a third stage cf the insertion.

According to another feature of the invention, an expedient design of the apparatus wherein only two successive cut-in stages and, therefore, particularly simply constructed plug connectors can be employed is that the contact members are differently disposed and/or designed such that, when the insert is inserted into the receptacle, the contact members for the input voltage, the contact members for the resistor and the contact members for the second terminal of the capacitor come into contact with one another at one time and the contact members for the first terminal of the capacitor come into contact with one another at a later time.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
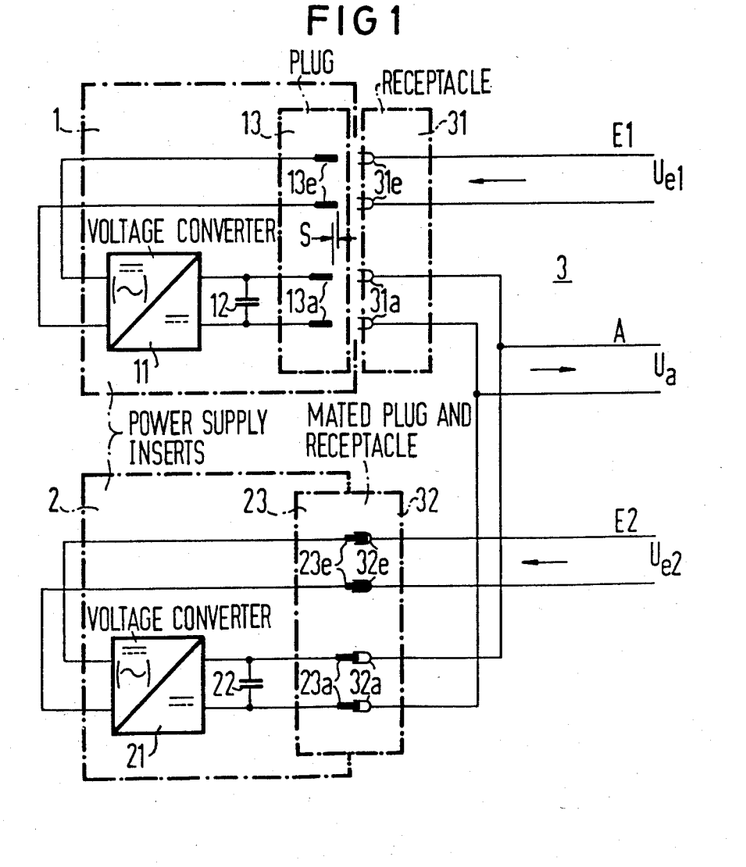
FIG. 1 is a schematic diagram of apparatus for a redundant power supply comprising two power supply inserts.

Referring to FIG. 1, a redundant power supply is illustrated as having two identically-constructed power supply inserts 1 and 2. The power supply insert 1 contains a voltage converter 11 whose output is connected to a storage capacitor 12. The power supply insert 2 contains a voltage converter 21 whose output is connected to a storage capacitor 22.

The wiring of the receptacle 3 which, in particular, is a rack of the so-called format 7R for communications transmission systems is conducted to a pair of connectors 31 and 32 whose counterparts are the connector 13 of the power supply insert 1 and the connector 23 of the power supply insert 2. In the case of the converter 11, the input lies at the leading contacts 13e and the output lies at the non-leading contacts 13a of the plug connector 13. In the case of the converter 21, the input lies at the leading contacts 23e and the output lies at the non-leading contacts 23a of the plug connector 23. The input voltages $U_{e1}$ and $U_{e2}$, respectively, of the converters can be d.c. or a.c. voltages depending on the type of the converters 11 and 21, respectively.

FIG. 1 illustrates the condition in which the power supply insert 2 is completely inserted into the receptacle 3 and the power supply insert 1 is not yet in its inserted condition.

The input voltage $U_{e2}$ is fed to the input of the converter 21 via the contact members 32e, 23e. The output of the converter 21 is fed via the contacts 23a, 32a to the output A for the operating voltage $U_a$ of an electronic system to be supplied.

The plug connector 13 contains the two leading contacts 13e and the two non-leading contacts 13a. When the power supply insert 1 is inserted into the receptacle 3, therefore, contact is first produced between the contact members 13e and 31e and is later produced between the contact members 13a and 31a. This is based on the fact that the end faces of the contact members 13e and 13a are disposed offset by an amount S relative to one another.

The speed with which the contacting occurs between the leading contacts and the non-leading contacts is expediently limited by an apparatus for limiting the plugging speed as illustrated in FIG. 2.

Figure 2A:
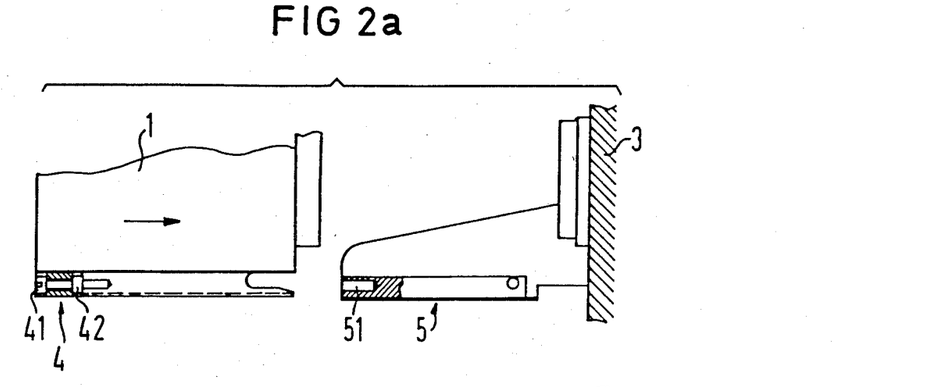
FIG. 2 illustrates a receptacle with a power supply insert insertable therein.
Figure 2B:
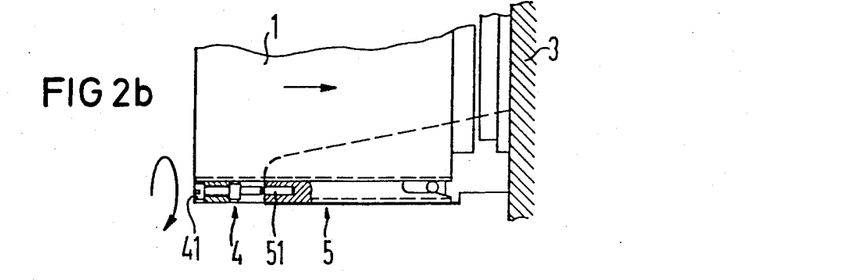
Figure 2C:
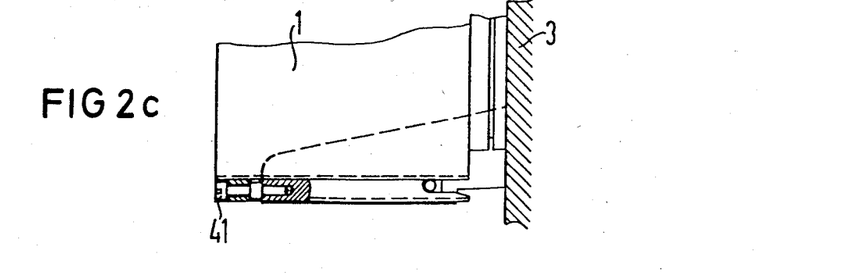

FIG. 2 shows the insertion of the power supply insert 1 into the receptacle 3, namely in the following three stages or positions from top to bottom. In the first position of FIG. 2a, the power supply insert 1 is still separated from the receptacle 3 and has been inserted into the receptacle 3 to such a degree in FIG. 2b that the plug connector of the power supply insert and the assigned receptacle connector of the receptacle 3 are directly opposite one another at a slight distance. In FIG. 2c, the power supply insert 1 is entirely inserted into the receptacle 3 and locked by a latch device.

A speed limiting and locking apparatus provides a screw 41 having a shoulder 42 and captively held between the screw head and the shoulder 42. In the position of FIG. 2b, the start of a threaded bore 51 forms a detent for the screw 41, so that the power supply insert 1 to be inserted into the receptacle 3 is initially arrested in the position of FIG. 2b.

Proceeding from the position of FIG. 2b, the power supply insert 1 is slowly moved into its final position by turning the screw 41, and all contact members of the mutually-assigned connectors 13 and 31 contact one another in the final position.

Essential for the device for limiting the plug speed is that, during the transfer of the power supply insert 1 from the position of FIG. 2b into the position of FIG. 2c, the motion of the actuating element is converted in defined fashion into a displacement of the power supply insert. Instead of utilizing the screw 41, this can occur, for example, with the assistance of a bayonet closure.

Another possibility of holding the screw 41 is to dispose the screw head in a cage which holds the screw head at the front and the back thereof in the plug-in direction.

Figure 3:
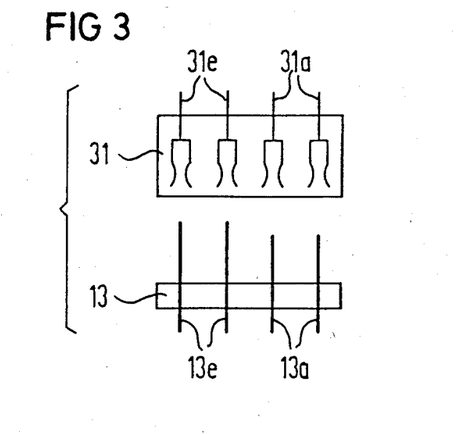
FIGS. 3–5 illustrate different forms of plug connectors having leading contacts, in particular with FIG. 3 illustrating differently designed contact pins, FIG. 4 illustrating differently designed contact springs, and FIG. 5 illustrating differently arranged contact pins.
Figure 4:
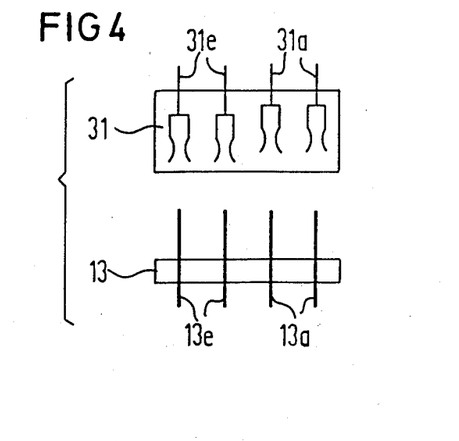
Figure 5:
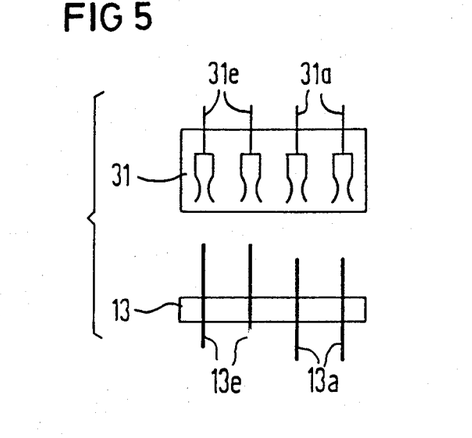

FIGS. 3–5 illustrate modifications of the mutually-assigned connectors 13 and 31 of FIG. 1. A respective multiple socket strip 31 and multiple pin strip 13 are therefore illustrated.

According to FIG. 3, the spring contacts of the spring contact strip 31 are identically designed and arranged. The pins of the multiple pin strip 13, by contrast, are of different lengths, i.e. are differently designed. At that side facing the spring contacts, the end faces of the contact members are arranged offset relative to one another by an amount which, due to the structure of the spring contacts, still guarantees a reliable contacting at all contact members.

In FIG. 4, the spring contacts of the two non-leading contacts are disposed offset somewhat into the interior of the spring contact strip.

Figure 6:
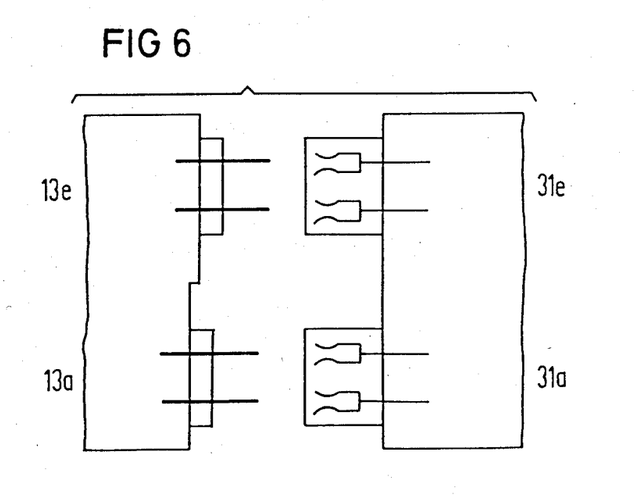
FIG. 6 illustrates plug connectors arranged offset for an input voltage and an output voltage.

According to FIG. 5, the spring contacts and the pins are respectively identically designed. The pins, however, are differently arranged in the pin strip. FIG. 6 illustrates an embodiment wherein separate plug connectors are provided for the input voltage $U_e$ and the output voltage $U_a$. Both plug connectors are identically designed but are arranged somewhat offset relative to one another in the plugging direction. The offset has a value at which a reliable contacting is still guaranteed for both plugs.

Figure 7:
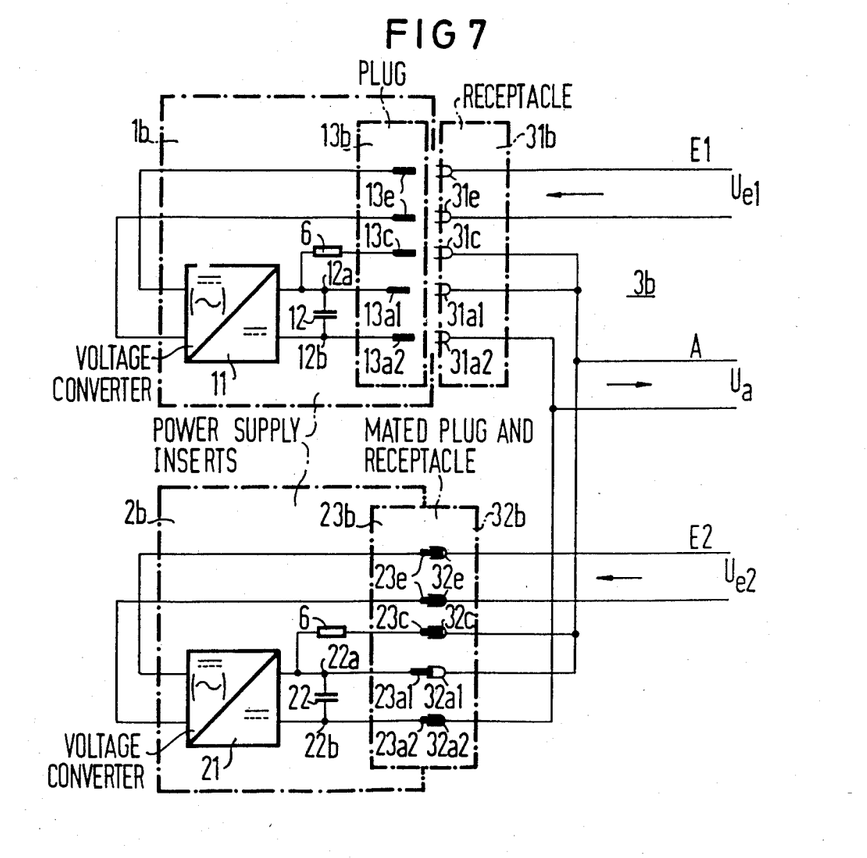
FIG. 7 is a schematic representation of apparatus for a redundant power supply in which the power supply inserts are provided with an additional capacitor charging current.

FIG. 7 illustrates apparatus for a redundant power supply which has two identically-constructed power supply inserts 1b and 2b. The power supply insert 1b contains the voltage converter 11 whose output is connected to the storage capacitor 12. The power supply insert 2b contains the converter 21 whose output is connected to the storage capacitor 22.

The wiring of the receptacle 3b which, in particular, is a rack of the so-called format 7R for communications transmission systems, is conducted to the connectors 31b and 32b whose counterparts are the connector 31b of the power supply insert 1b and the connector 23b of the power supply insert 2b. In particular, the plug connectors 13b and 23b are designed as blade connectors and the connectors 31b and 32b are designed as spring connectors. In the case of the converter 11, the input is connected to the leading contacts 13e and the output is connected to the non-leading contacts 13a1 and 13a2 of the plug connector 13b. In the case of the converter 21, the input is connected to the leading contacts 23e and the output is connected to the non-leading contacts 23a1 and 23a2 of the plug connector 23b. The input voltage $U_{e1}$ and $U_{e2}$, respectively, of the converters can be d.c. or a.c. voltages depending on the type of the converters 11 and 21, respectively.

FIG. 7 illustrates the condition in which the power supply insert 2b is fully inserted into the receptacle 3b and the power supply insert 1b is still in its non-inserted position.

The input voltage $U_{e2}$ is fed via the contact members 32e, 23e to the input of the converter 21. The output of the converter 21 is fed via the contact members 23a1, 32a1 and 23a2, 32a2 to the output A for the operating voltage $U_a$ of an electronic system supplied by the redundant power supply.

The plug connector 13b contains the two leading contacts 13e, the leading contacts 13c and 13a2 and the nonleading contact 13a1. Upon insertion of the power supply insert 1b into the receptacle 3b, therefore, contact is first produced between the contact members 13e and 31e, as well as between the contact members 13c, 13a2 and contact between the contact members 13a1 and 31a1 is not produced until a later time. This is based on the fact that the end face of the contact member 13a1 is rearwardly offset from the remainder of the contacts of the plug connector 13b.

In this case, also, the speed with which the contactings by the leading contacts and the non-leading contacts follow one another is expediently limited by an appliance for limiting the plugging speed, such as illustrated in FIG. 2.

When, proceeding from the operating condition illustrated in FIG. 7, the power supply insert 1b is inserted into the receptacle 3b, with the power supply insert 2b already in a feeding condition, the contact members 13e are first connected with the contact members 31e at the input side and the contact members 13c and 13a2 at the output side are connected to the contact members 31c and 31a2. In this intermediate condition, the converter 11 is placed in operation and the storage capacitor 12 is charged via a resistor 6 of the power supply insert 1b proceeding from the output of the power supply insert 2b. The storage capacitor 12 is thereby connected to the output voltage $U_a$ via the leading contacts 13c, 31c and the resistor 6 lying in series therewith which serves as a drop resistor or, respectively, charging resistor.

The analogous case applies to the identically-constructed power supply insert 2b when the same is inserted into the receptacle 3 while the power supply insert 1b is already operating.

What is achieved in connection with a mechanical device for limiting the plugging speed between the contacting of the leading contacts and the contacting of the non-leading contacts is that the storage capacitor 12, or respectively, 22 at the output side of the power supply insert 1b or, respectively, 2b to be plugged in is already sufficiently charged when the storage capacitor 12 and 22 of the two power supply inserts 1b and 2b are connected directly parallel to one another via the non-leading plug contacts.

In this manner, inadmissibly great voltage discontinuities and/or charging currents are also effectively avoided when the power supply insert to be additionally placed in operation only starts up slowly, particularly due to a limitation of the cut-in current picked up by the input.

The charging of the storage capacitor 12 or, respectively, 22 can only take place proceeding from the output or be promoted proceeding from the output. In both cases, an increase in the maximum allowed plugging speed derives with the given maximally-allowed collapse of the output voltage. The range of application of the apparatus of FIG. 2 can thereby be significantly expanded.

The additional resistor is particularly dimensioned such that the maximum value of the current flowing through this resistor just barely does not lead to the feeding power supply proceeding into its condition of current limitation. For example, the nominal voltage and the nominal current of an individual power supply amounts to 5 V and 10 A, respectively. The current limitation begins, for example, at 15% excess current. The initial charging current in the example under consideration can then amount to 1.5 A. Since the entire output voltage $U_a$ lies at the resistor 6 at the beginning of the charging operation, the value of the resistor 6 derives at $$5\ V/1.5\ A = 3.33\ \Omega.$$

Given the apparatus of FIG. 7, also, the plug connectors can fundamentally be designed in accordance with FIGS. 3–6, with the sole prescription that, instead of two leading and two non-leading contact members, a plurality of four leading and one non-leading contact member is employed.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a redundant power supply of the type in which at least two power supply inserts are plug mated to and supported by receptacle apparatus by way of respective pair of matable electrical connectors, in which each power supply insert includes a respective voltage converter having an input for receiving a respective input voltage and an output to be connected in parallel by the plugging operation for delivering an output voltage to a common load, in which each voltage converter has an output capacitor connected across its output, and in which the matable electrical connectors have respective matable contacts for the input and output voltages, the improvement therein comprising:

voltage collapse prevention means for preventing discharge of the output capacitor of an operating one power supply insert upon plugging in of another not yet operating power supply insert, said voltage collapse prevention means comprising mounting means mounting the input voltage contacts ahead of the output voltage contacts in the plugging direction in one of the respective pair of electrical connectors so that the input voltage contacts engage and place the respective voltage converter into operation before the output voltage contacts engage and connect the output capacitors in parallel, and insertion means for coupling the power supply inserts and the receptacle apparatus and operable to move a power supply insert from a position where the input voltage contacts first engage to a position where all of the respective contacts are in complete engagement.

2. The improved redundant power supply of claim 1, wherein:

the connector of the pair of connectors which is disposed on the power supply insert side comprises said mounting means.

3. The improved redundant power supply of claim 1, wherein:

the connector of the pair of connectors which is disposed on the receptacle apparatus side comprises said mounting means.

4. The improved redundant power supply of claim 2, wherein:

the contacts of the connector on the power supply insert side are pin contacts.

5. The improved redundant power supply of claim 3, wherein:

the contacts of the connector on the receptacle apparatus side are socket contacts.

6. The improved redundant power supply of claim 1, wherein:

said insertion means comprises arresting means.

7. The improved redundant power supply of claim 1, wherein:

said insertion means comprises a threaded bore in the respective apparatus; and a screw on the power supply insert for engaging said threaded bore and advancing the power supply insert.

8. The improved redundant power supply of claim 1, wherein:

said insertion means comprises detent means carried by the receptacle apparatus and defining a location at which the input voltage contacts are in engagement, and means for advancing the power supply insert beyond said detent means to a location at which all respective contacts are in complete engagement.

9. The improved redundant power supply of claim 1, wherein:

each of the matable connectors comprises an additional contact for mating at the time of engagement of the input voltage contacts; and each power supply insert comprises a charging resistor connected between the respective output capacitor and the respective additional contact.

* * * * *